US00RE34886E

United States Patent [19]

Irie

[11] E Patent Number: Re. 34,886

[45] Reissued Date of Patent: Mar. 28, 1995

[54] ELECTRICAL SYSTEM FOR VEHICLE DAYTIME RUNNING LIGHTS

[75] Inventor: Tsutomu Irie, Hamilton, Canada

[73] Assignee: See-Me Lights Corporation, Livonia, Mich.

[21] Appl. No.: 91,591

[22] Filed: Jul. 14, 1993

Related U.S. Patent Documents

Reissue of:

[64] Patent No.: 4,841,199
Issued: Jun. 20, 1989
Appl. No.: 151,979
Filed: Feb. 3, 1988

[30] Foreign Application Priority Data

May 2, 1987 [CA] Canada ..... 529127

[51] Int. Cl.[6] ..... B60Q 1/02

[52] U.S. Cl. ..... 315/83; 315/82; 315/89; 315/191; 315/192; 315/69; 315/66; 315/340; 315/362

[58] Field of Search ..... 315/83, 82, 89, 191, 315/192, 69, 66, 340, 362

[56] References Cited

U.S. PATENT DOCUMENTS

| | | | |
|---|---|---|---|
| 4,684,819 | 8/1987 | Haag et al. | 307/10 LS X |
| 4,686,423 | 8/1987 | Eydt | 315/82 |
| 4,713,584 | 12/1987 | Jean | 315/83 |
| 4,723,095 | 2/1988 | Svazas et al. | 315/83 X |
| 4,928,036 | 5/1990 | Abboud | 315/82 |

FOREIGN PATENT DOCUMENTS

| | | |
|---|---|---|
| 932790 | 8/1973 | Canada . |
| 1041594 | 10/1978 | Canada . |

*Primary Examiner*—Robert J. Pascal
*Assistant Examiner*—Reginald A. Ratliff
*Attorney, Agent, or Firm*—Gifford, Krass, Groh, Sprinkle, Patmore, Anderson & Citkowski

[57] ABSTRACT

The invention consists of an electrical circuit for a vehicle headlight system whereby the conventional parallel circuit connection of headlights is automatically converted into a series circuit connection under conditions appropriate for daytime running lights, whereby the light output of the headlights is reduced as compared to that in conventional headlight circuit mode, and a method for interconnecting such circuit with conventional headlight systems.

6 Claims, 5 Drawing Sheets

ELECTRICAL SYSTEM FOR VEHICLE DAYTIME RUNNING LIGHTS

Matter enclosed in heavy brackets [ ] appears in the original patent but forms no part of this reissue specification; matter printed in italics indicates the additions made by reissue.

FIELD OF THE INVENTION

This invention relates to automotive electrical systems and, in particular, to electrical circuitry to control the headlights of an automobile in both day and night conditions.

PRIOR ART

For many years it has been recognized that a vehicle operating with its headlights on during the day is more easily seen by drivers of other vehicles. Greater visability is thought to reduce the likelihood of accidents. Accordingly, a number of drivers, with a view to that advantage, turn their headlights on during the day.

However, there have been perceived disadvantages concomitant with the use of headlights during the day. For example, at full power, headlights draw considerable energy from the car. Gas must be burnt to generate power to operate them or power must be drawn from the battery. Therefore, a car with headlights on will have a lower gas mileage rating than a car with headlights off. Moreover, the life of the headlight filaments is reduced. There is also a danger that car headlights may be left on when the car is parked which may drain the battery to the extent that the car will not restart. Even if the car if left idling at low rpm's, the energy of the requirements of the car, augmented by the requirement to power the headlights, may draw power from the battery. There is also the disadvantage that headlights may cause distracting or disturbing glare for other drivers which may cause them to switch their rearview mirrors to nighttime reduced reflection or to take other actions which may lead to lesser visibility and unsafe conditions.

A need had therefore been perceived to provide for daytime running lights which can operate at reduced glare, with low energy consumption and which are automatically turned on when the engine is running and are automatically turned off when the engine is not running. In this manner the advantages of daytime running lights may be obtained without the disadvantages.

Two patents of interest which have been located by the inventors are Canadian Letters patent No. 1,041,594 which issued Oct. 31, 1978 to Westinghouse Electric Corporation for an invention entitled "Tri-Beam Roadway-Lighting System for Motor Vehicles" and Canadian Letters patent No. 932,790 which issued Aug. 28, 1973 to General Motors Corporation for an invention entitled "Vehicle Daytime Running Lights".

Canadian Letters Patent No. 1,041,594 discloses four headlights mounted in paired relationships on the front of a vehicle. The headlight filaments are energized in various combinations to provide a low beam, a mid beam and a high beam lighting mode each of which have light distribution patterns which provide improved illumination of the roadway under various driving and traffic conditions with a minimum of glare. The patent does not, however, disclose a lower intensity daytime running lights mode of illumination. Moreover, there is no provision for automatic turning on of the headlights for daytime operation.

Prior art devices have sought to reduce the intensity of the light output by placing an impedance in series with the headlight filaments. As pointed out in Canadian patent No. 932,790, this solution has the disadvantage that heat is dissipated in the impedance and energy is thereby wasted.

Canadian Letters patent No. 932,790 discloses daytime running lights of lower intensity than the low beam headlight mode of operation. According to the patent, the output from one of the output terminals of the three-phase alternating current generator is half wave rectified and is then supplied to the low beam filaments to provide for the diminished illumination. The disadvantage of the approach suggested by Canadian patent No. 932,790 is that the low beam filaments will always be energized by the output of the generator even when the high beam mode has been selected by the vehicle operator. This results in an unnecessary load on the vehicle's electrical system.

The present invention attempts to overcome the problems of glare and high energy consumption while providing an apparatus and method for readily connecting the apparatus to conventional headlight systems.

OBJECTS OF THE INVENTION

It is therefore an object of the invention to provide a circuit for establishing a daytime running mode of operation of vehicle headlights wherein the intensity of the light output is reduced from that in the normal low beam or high beam modes of operation.

It is another object of this invention to provide such a circuit for establishing a daytime running mode of operation of vehicle headlights without the use of an impedance in series with the headlight filaments.

It is yet a further object of this invention to provide such a circuit wherein the daytime running mode is automatically selected and activated when the vehicle engine is running and the vehicle operator has not selected either the low beam or the high beam mode of operation, and which is not selected or activated otherwise.

It is yet a further and important object of the invention to provide a circuit for establishing a daytime running mode of operation which can be conveniently manufactured as a unit for easy installation in conventional vehicle headlight systems.

Finally it is an object of this invention to provide an easy method for installing such a circuit with conventional headlight systems.

STATEMENT OF THE INVENTION

One aspect of the present invention consists in providing a headlight circuit for a vehicle, said vehicle having an engine and a plurality of headlights including headlight filaments, and wherein the vehicle operator may select a normal mode of operation of said headlights whereby a parallel circuit connection is established between at least two headlight filaments, comprising in combination electrical circuit means for establishing said parallel circuit connection between said headlight filaments, electrical circuit means for establishing a series circuit connection between said headlight filaments, means for detecting when the engine is running, means for detecting when the operator has selected said normal mode of operation of the headlights, electrical circuit means for converting said parallel circuit connection to said series circuit connection when the engine is running and the operator has not selected the normal mode of operation of the headlights, whereby said conversion of said parallel circuit connection to said series circuit connection reduces the current flowing through the headlight filaments and reduces the intensity of the light output from said filaments.

In particular, the circuit according to the invention comprises in combination a headlight circuit for a vehicle having an engine and a plurality of headlights including headlight filaments having first and second contact points between which an electrical potential may be applied to induce said filaments to emit light comprising in combination: means for electrically connecting the first contact point of a first of said filaments to a first contact point of a second of said filaments, means for selectively connecting said first contact points of said first and second filaments to a power source means for electrically connecting a second contact point of said first filament to a point of common electrical potential, means for electrically connecting a second contact point of said second filament to switching means, switching means being adapted to assume a first state establishing an electrical connection to said point of common electrical potential or a second state establishing an electrical connection to said power source, means for detecting when the vehicle engine is running, means for establishing said second state of said switching means only when the engine is running and said first contact points of said first and second filaments are not connected to said power source.

A further aspect of the invention resides in a method for connecting a daytime running light circuit to the headlight system of a vehicle as hereinafter described.

DESCRIPTION OF THE PREFERRED EMBODIMENT

In the figures, like numerals represent like elements.

Conventional Headlight Systems

Figure 1:
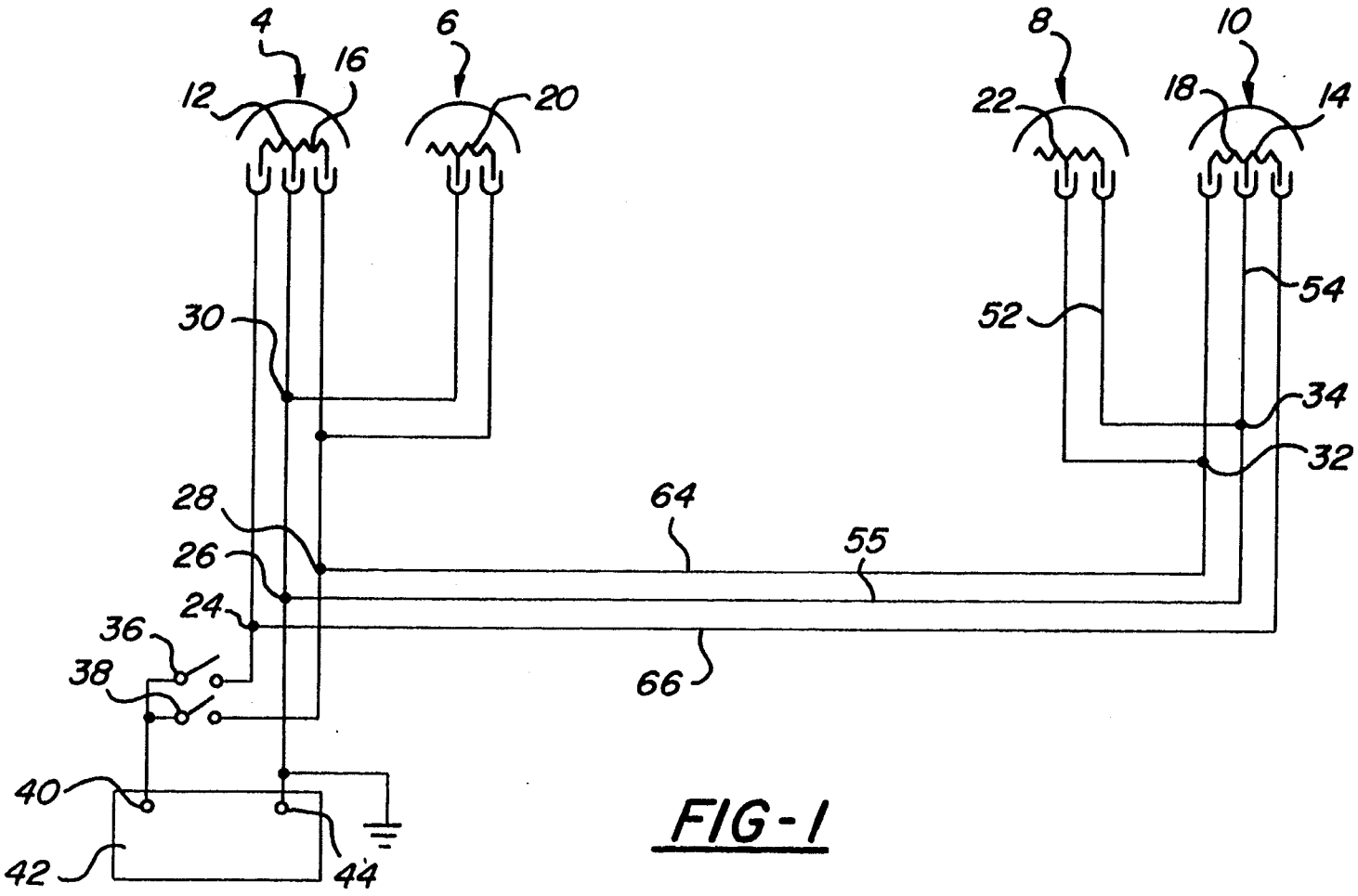
FIG. 1 illustrates the circuitry of a conventional four headlight system.

Referring to FIG. 1, a conventional four headlight system includes four headlights from left to right, indicated by the numerals 4, 6, 8 and 10 respectively. Headlights 4 and 10 have low and high beam filaments 12, 14 and 16, 18 respectively. Headlights 6 and 8 have only a high beam filament (20 and 22 respectively).

The vehicle operator selects either the low beam or the high beam mode by closing switch 36 or switch 38 respectively. When they are closed, switches 36 and 38 provide supply voltage from positive terminal 40 of vehicle battery 42 thus energizing the low or high beam headlight filaments respectively. The negative terminal 44 of battery 42 is grounded.

Low beam filaments 12 and 14 are connected in parallel with one another (at 24 and 26). Similarly, high beam filaments 16, 18, 20 and 22 are connected in parallel with each other (at 28, 30, 32 and 34).

The Invention

The invention operates to connect the right and left side headlight filaments in series with one another (as opposed to the conventional parallel arrangement discussed above) under specified conditions, namely when the engine is running but neither the low or high beam modes are selected. This series configuration is referred to herein as the daytime running mode.

Figure 2:
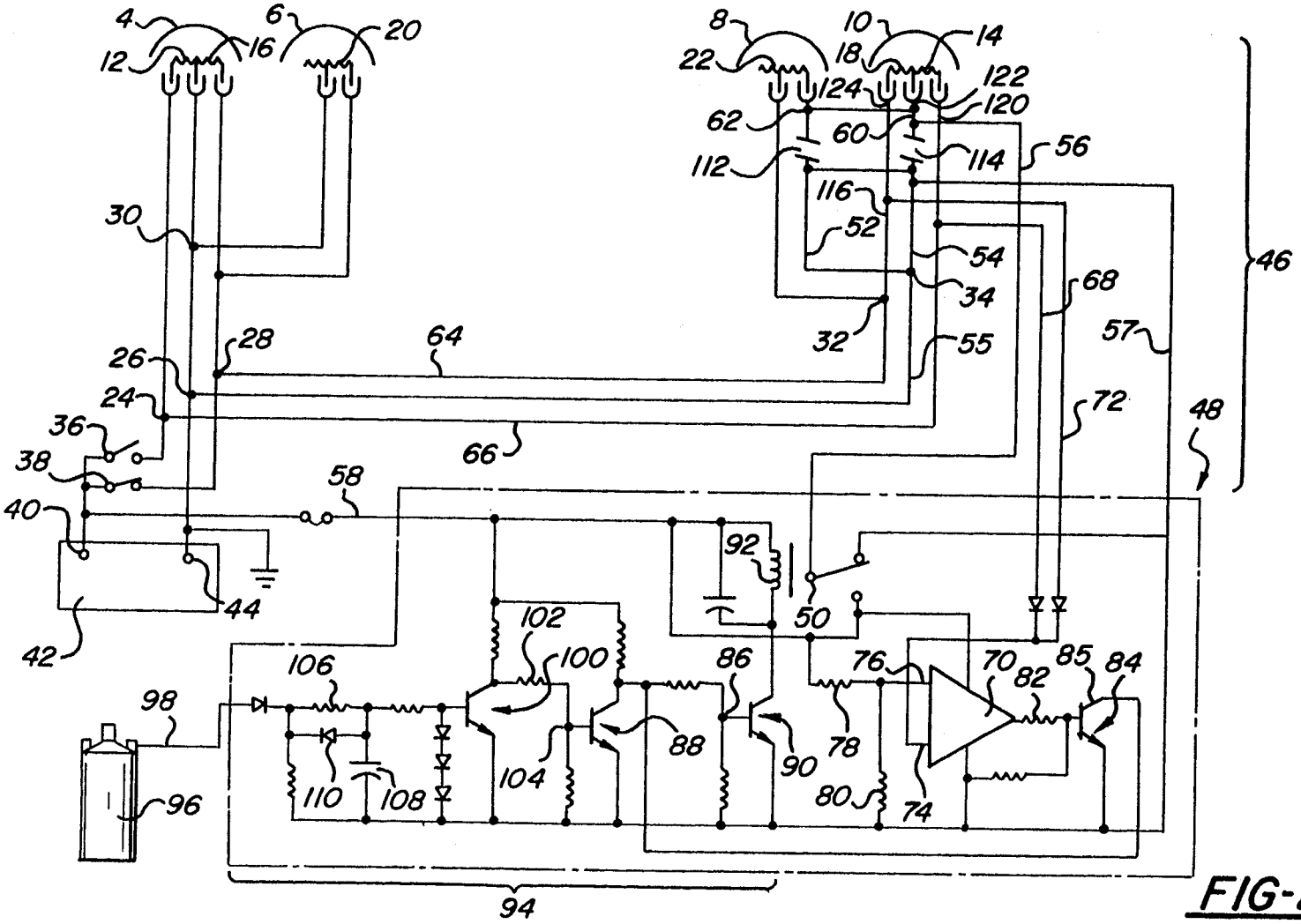
FIG. 2 illustrates the circuitry of this invention connected with a conventional four headlight system when the headlights are operating at high beam under normal intensity under night conditions.

Referring to FIG. 2, the invention includes a headlight circuit 46 and an actuating circuit 48 (shown within dotted lines). The configuration of headlight circuit 46 is dependent on the position of a switch 50 which is governed by the operation of actuating circuit 48.

Figure 3:
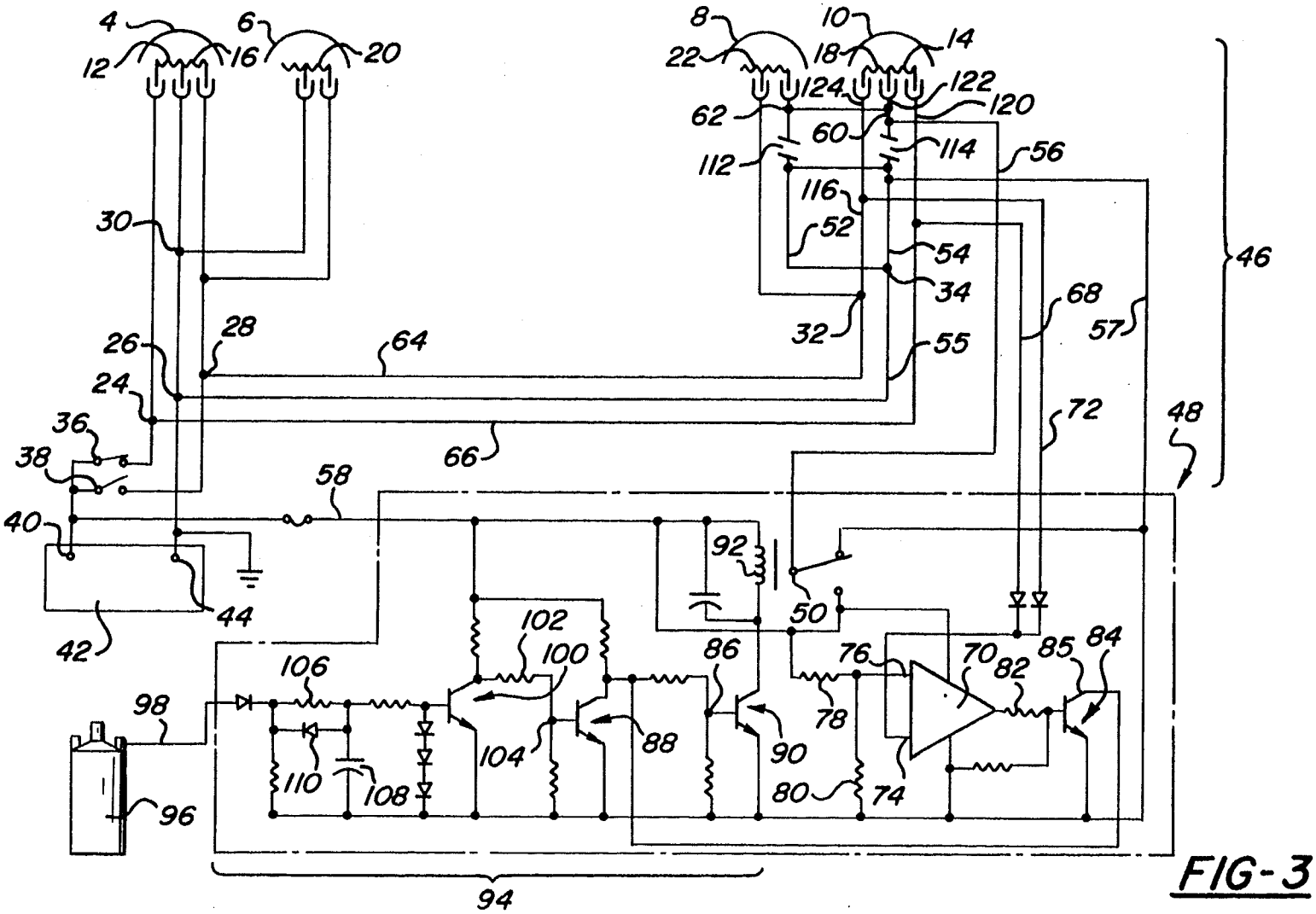
FIG. 3 illustrates the circuitry of the invention connected with a conventional four headlight system when the headlights are operating at low beam under normal intensity under night conditions.

As will be discussed in greater detail below, actuating circuit 48 will operate to move switch 50 to the position shown in FIGS. 2 and 3 ("first position") when the engine is not running or the operator selects the low or high beam modes. In either of these cases, headlight circuit 46 remains configured according to the conventional headlight system.

Figure 4:
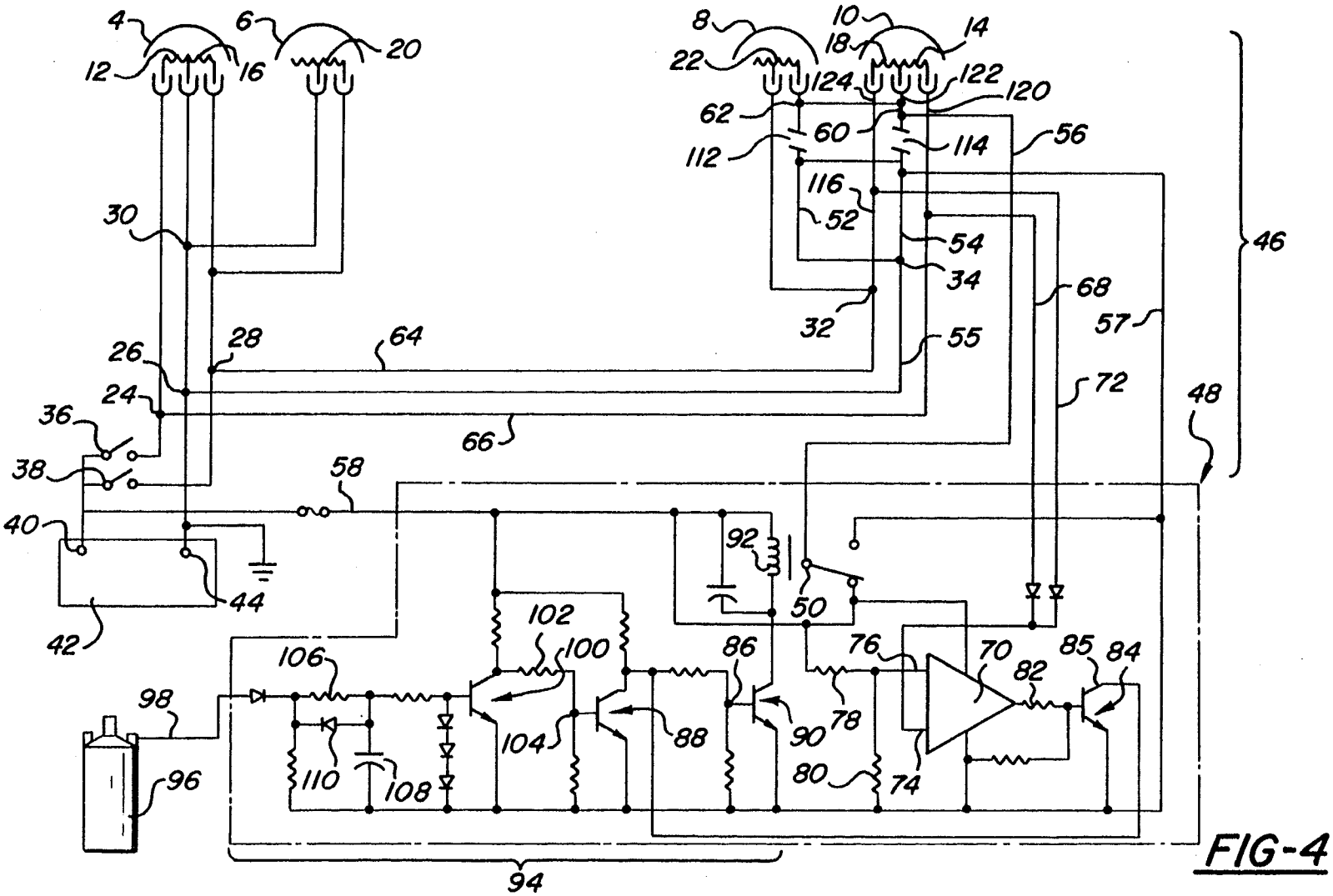
FIG. 4 illustrates the circuitry of the invention connected with a conventional four headlight system when the headlights are operating in the daytime running mode.

When the engine is running and neither the low not the high beam modes have been selected, actuating circuit 48 will operate to move switch 50 to the second position shown in FIG. 4 and thus effectively reconfiguring headlight circuit 46 so as to connect right and left side low beam filaments 14 and 12 respectively in series with one another. Similarly, right and left side high beam filaments 18, 22 and 16, 20 respectively will also be connected in series with one another.

As will be readily appreciated by those skilled in the art, less current will flow through each filament when they are connected in series than when they are connected in the parallel configuration of the conventional system such that the intensity of the headlights will be reduced. This will reduce the current which would otherwise be drawn by the lights in the conventional configuration while nonetheless enhancing the visibility of the vehicle to other drivers on the road.

Operation of the circuit

In conventional headlight systems, headlights 8, 10 are grounded by wires 52, 54. In the circuit according to the invention, when switch 50 is in the first position as shown in FIGS. 2 and 3, the path from headlights 8, 10 to grounded terminal 44 of battery 42 is merely redirected via lead 57 through switch 50. Thus it can be seen that when switch 50 is in the first position headlight circuit 46 remains in the conventional circuit configuration.

When switch 50 is in the second position (daytime running mode), the following circuit is established.

Supply voltage from positive terminal 40 of battery 42 is fed via lead 58 through switch 50 to lead 56. Thus lead 56 which was grounded in the conventional circuit configuration becomes the supply voltage line in the daytime running mode.

Supply voltage line 56 is connected to high beam filaments 18 and 22 of right side headlights 10 and 8 respectively. High beam filaments 18 and 22 are also connected at 32 such that they are in parallel with one another. The parallel combination of high beam filaments 18 and 22 is connected in series with high beam filaments 16 and 20 of the left side of the vehicle by lead 64.

Supply voltage line 56 is also connected to low beam filaments 14 of right side headlight 10, and right side low beam filament 14 is connected in series with left side low beam filament 12 by lead 66.

It will be appreciated by those skilled in the art that as a result of the series connections between the right and left side headlight filaments, the current drawn from the vehicle battery will be reduced as compared to the conventional parallel configuration thus effectively prolonging the life of the battery and the energy available for other functions.

It will appreciated by those skilled in the art that connecting the headlights in series to reduce battery current drain is preferable to placing an impedance in series with the conventional parallel circuit since substantially all of the dissipated power is used up through the headlight filaments rather than having a portion thereof wasted as dissipated heat through the impedance.

Operation of the Actuating Circuit

When the operator has chosen the low beam mode, switch 36 will be closed and line 66 will be energized. Lead 68 of actuating circuit 48 is connected to line 66 and will therefore provide a supply level voltage to input 74 of comparator 70.

When the operator has selected the high beam mode by closing switch 38, line 64 becomes energized. Lead 72 of actuating circuit 48 will therefore provide a supply level voltage to input 74 of comparator 70.

The second input 76 of comparator 70 is a voltage divider circuit consisting of resistors 78 and 80 which provide a reference input voltage to comparator 70. When input 74 of comparator 70 is at supply level voltage (indicating that either the low beam or the high beam mode has been selected) comparator 70 will produce sufficient output across resistor 82 to turn on transistor 84. The collector 85 of transistor 84 will draw current to the base 86 of transistor 90 thus cutting off transistor 90 and electromechanical relay 92. With electromechanical relay 92 inactive, switch 50 will remain in the first position and headlight circuit 46 will remain in the conventional configuration.

When neither the low nor the high beam headlights have been selected, comparator 70 will not provide sufficient output to turn on transistor 84. In this case, the state of transistor 90 and consequently of electromechanical relay 92 will be determined by the combination of the circuit elements generally indicated by the numeral 94, which sense whether the engine is running or not.

When the engine is not running, ignition coil 96 provides no voltage to lead 98. In this condition, transistor 100 is cut off. Current is therefore developed through resistor 102 to the base 104 of transistor 88 which will turn on. This in turn will turn off transistor 90 such that electromechanical relay 92 will no be activated. Switch 50 will therefore remain in the first position and headlight circuit 46 will remain in the conventional configuration.

When the engine is started, ignition coil 96 will provide voltage to lead 98. Resistor 106 and capacitor 108 are chosen so as to provide an approximately 30 second delay between the time the engine is started and the time the actuating circuit reaches equilibrium so as to avoid premature activation of the daytime running lights. Turning on the daytime running lights too soon might divert current from the battery which is otherwise required to start the engine.

At equilibrium, transistor 100 will be turned on, thus cutting off transistor 88 and turning on transistor 90. With transistor 90 conducting, electromechanical relay 92 will be activated and switch 50 will be moved to the second position to configure headlight circuit 46 to the daytime running mode, as described above.

Diode 110 is provided to ensure that once the engine is turned off, capacitor 108 will be quickly discharged so as to shut off the daytime running lights and avoid depletion of the battery.

It will be appreciated by those skilled in the art that minor deviations from the above embodiment may be effected without departing from the scope of the invention. For example, lead 98 may be connected to any conductor which will be at supply level voltage when and only when the vehicle engine is running. This will be necessary in vehicles which do not use an ignition coil.

The vehicle headlights might also have a different arrangement of high and low beam filaments. In such cases, slight modifications can be made to the headlight circuit 46 without departing from the scope of the invention.

Installation

The actuating circuit 48 of the invention has been designed such that it can be manufactured as a unit and be simply and easily connected to existing conventional headlight systems.

It will be appreciated by those skilled in the art that the installation of actuating circuit 48 with conventional headlight systems may be effectively accomplished on either the left or the right side headlights of the vehicle. This is advantageous since the vehicle battery is often installed near either the right or the left headlights thus impeding easy installation of the unit on that side.

Moreover, the actuating unit according to the invention may be installed either with the conventional four headlight systems described above or with conventional two headlight systems wherein each side of the vehicle has only one headlight which includes both a high beam and a low beam filaments.

The actuating unit according to the invention includes six leads for interconnection with conventional headlight systems. The leads correspond to the leads indicated in the figures by the numerals 56, 57, 58, 68, 72, 98.

Installation with Four Headlight Systems

A first lead 98 of the unit is connected to the positive terminal of the ignition coil 96 of the vehicle. In vehicles which do no use an ignition coil, the first lead may be connected to any line which is energized only when the engine is running.

A second lead 58 is connected to the positive terminal 40 of the vehicle battery 42.

In a four headlight system, one of the headlights on each side of the vehicle will typically have three contacts corresponding to the leads indicated by the numerals 120, 122 and 124 of the figures, while the other headlight on each side of the vehicle will typically have two contacts corresponding to the leads indicated by the numerals 126 and 128 of the figures. Each of such three contact headlights will have a ground wire 122,128 leading to the negative terminal of the vehicle battery.

The ground wires 122,128 of both the three contact and the two contact headlights are severed as at 122, 114. The severed ground wires leading to the headlights are both reconnected to a third lead 56. The severed ground wires leading to the negative terminal of the vehicle battery are reconnected to a fourth lead 57.

Finally, a fifth lead 68 is connected to one of the two remaining non-ground leads of the three contact headlight and the sixth lead 72 of the unit is connected to the least non-ground lead of the three contact headlight.

Installation with a Two Headlight System

In the case of the typical two headlight system, the headlights on each side of the vehicle are three contact headlights with one of the contacts being grounded to the negative terminal of the battery.

The installation of the actuating unit according to the invention is similar to that for the four headlight systems.

The first lead 98 is connected to the positive terminal of the ignition coil or its electrical equivalent as described above.

The second lead 58 is connected to the positive terminal of the vehicle battery.

Figure 6:
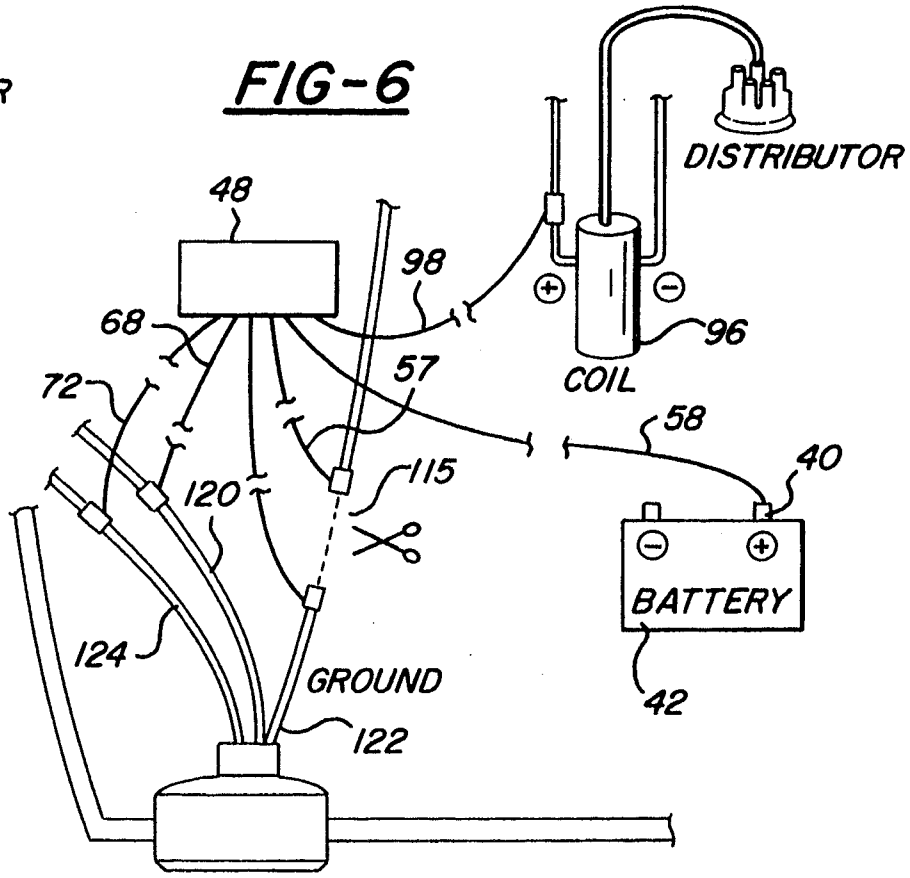
FIG. 6 illustrates the method according to the invention for connecting a daytime running light circuit to a conventional two headlight system.
Figure 5:
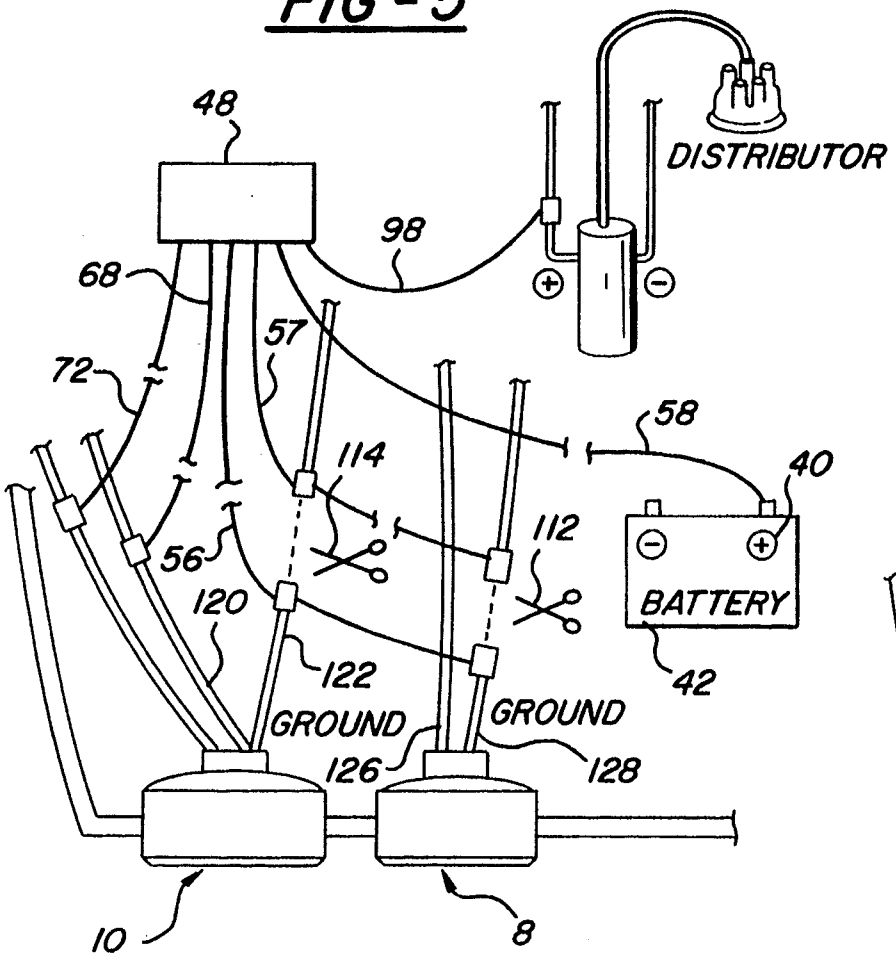
FIG. 5 illustrates the method according to the invention for connecting a daytime running light circuit to a conventional four headlight system.

The ground wire 122 leading from the headlight to the negative terminal of the battery is severed as at 115 in FIG. 6. The severed wire leading to the headlight is connected to the third lead 56 and the severed wire leading to the negative terminal of the battery is connected to the fourth lead 57.

The fifth lead 68 is connected to one of the two remaining wires to the headlight and the sixth lead 72 is connected to the last remaining wire to the headlight.

What is claimed is:

1. A headlight circuit for a vehicle, said vehicle having an engine and a plurality of headlights including headlight filaments, and wherein the vehicle operator may select a normal mode of operation of said headlights whereby a parallel circuit connection is established between at least two headlight filaments, comprising in combination:

electrical circuit means for establishing said parallel circuit connection between said headlight filaments;

electrical circuit means for establishing a series circuit connection between said headlight filaments;

means for detecting when the engine is running;

means for detecting when the operator has selected said normal mode of operation of the headlights;

electrical circuit means for converting said parallel circuit connection to said series circuit connection when the engine is running and the operator has not selected the normal mode of operation of the headlights, whereby said conversion of said parallel circuit connection to said series circuit connection reduces the current flowing through the headlight filaments and reduces the intensity of the light output from said filaments.

2. A headlight circuit for a vehicle, said vehicle having an engine and right and left side headlights including low and high beam filaments, and wherein the vehicle operator may select operation of the headlights in a low beam mode by energizing a parallel circuit connection between the left and right side low beam filaments or in a high beam mode by energizing a parallel circuit connection between the left and right side high beam filaments comprising in combination:

electrical circuit means for establishing said parallel circuit connection between said left and right side low beam filaments;

electrical circuit means for establishing said parallel circuit connection between said left and right side high beam filaments;

means for detecting when the engine is running;

means for detecting when the operator has selected either the high or the low beam mode of operation;

electrical circuit means for establishing a series circuit connection between said left and right side low beam filaments;

electrical circuit means for establishing a series circuit connection between said left and right side high beam filaments;

electrical circuit means for converting said parallel circuit connection between the low beam filaments to said series circuit connection between said low beam filaments and the said parallel circuit connection between said high beam filaments to said series circuit connection between said high beam [filament] *filaments* when the engine is running and the operator has not selected either the high or the low beam mode of operation of the headlights, whereby said conversion reduces the current flow through said filaments and reduces the intensity of the light output from said filaments.

3. A headlight circuit for a vehicle having an engine and a plurality of headlights including headlight filaments having first and second contact points between which an electrical potential may be applied to induce said filaments to emit light comprising in combination:

means for electrically connecting the first contact point of a first of said filaments to a first contact point of a second of said filaments;

means for selectively connecting said first contact points of said first and second filament to a power source means for electrically connecting a second contact point of said first filament to a point of common electrical potential;

means for electrically connecting a second contact point of said second filament to switching means;

switching means being adapted to assume a first state establishing an electrical connection to said point of common electrical potential or a second state establishing an electrical connection to said power source;

means for detecting when the vehicle engine is running;

means for establishing said second state of said switching means only when the engine is running and said first contact points of said first and second filaments are not connected to said power source.

4. A headlight circuit for a vehicle, said vehicle having an engine and right and left side headlights including low and high beam filaments having first and second contact points between which an electrical potential may be applied to induce said filaments to emit light, and comprising in combination:

means for electrically connecting first contact points of each of said low beam filaments;

means for electrically connecting first contact points of each of said high beam filaments;

means for selectively connecting said first contact points of said low beam filaments to a power source;

means for selectively connecting said first contact points of said high beam filaments to a power source;

means for connecting second contacts of the low and high beam filaments on a first side of the vehicle to a point of common potential;

means for connecting second contacts of the low and high beam filaments on a second side of the vehicle to switching means;

said switching means being adapted to assume a first state establishing an electrical connection to said point of common potential or a second state establishing an electrical connection to said power source;

means for establishing said second state only when the engine is running and the first contacts of neither the low or high beam filaments are connected to said power source.

5. In a vehicle, said vehicle having a battery, said battery having negative and positive terminals, said vehicle further including a four headlight system including one two contact headlight on each side of the vehicle and one three contact headlight on each side of the vehicle, one of said contacts in each of said headlights being connected by a ground wire to a point at the same electrical potential as the negative terminal of the battery and the other of said contacts having wires connected to other parts of the vehicle, a method for establishing operative interconnection with said four headlight system of a circuit for automatically enabling daytime running lights of the vehicle under specified conditions, comprising the following combination of steps:

(a) Severing the ground wires of the three contact headlight and of the two contact headlight on one side of the vehicle, *so as to provide connected portions of the severed ground wires which are connected to the headlights and remaining portions of the severed ground wires which remain connected to the point at the same electrical potential as the negative terminal of the battery;*

(b) Reconnecting the *connected* portions of the severed ground wires which remain connected to the headlights together to a third lead of the circuit;

(c) Reconnecting the remaining portions of the severed ground wires which remain connected to the point at the same electrical potential as the negative terminal of the battery, together to a fourth lead to the circuit;

(d) Connecting a fifth lead of the circuit to one of the two remaining unsevered wires of the three contact headlights;

(e) Connecting a sixth lead of the circuit to the other of the two remaining unsevered wires of the three contact headlights;

(f) Connecting a first lead of said circuit to a point in the vehicle which is at a positive potential only when the vehicle engine is running;

(g) Connecting a second lead to the positive terminal of said battery.

6. In a vehicle, said vehicle having a battery, said battery having negative and positive terminals, said vehicle further including a two headlight system including one three contact headlight on each side of the vehicle, one of said contacts in each of said headlights being connected by a ground wire to a point at the same electrical potential as the negative terminal of the battery and the other two of said contacts in each headlight having wires connected to other parts of the vehicle, a method for establishing operative interconnection with said two headlight system of a circuit for automatically enabling daytime running lights of the vehicle under specified conditions, comprising the following combination of steps:

(a) Severing the ground [wires] *wire* of the headlight on one side of the vehicle *so as to provide a connected portion of the severed ground wire which is connected to the headlight, and a remaining portion of the severed ground wire which remains connected to the point at the same electrical potential as the negative terminal of the battery;*

(b) Reconnecting the *connected* portion of the severed ground wire which remains connected to the headlight to a third lead of the circuit;

(c) Reconnecting the remaining portions of the severed ground wire which remains connected to [a] *the* point at the same electrical potential as the negative terminal of the battery, together to a fourth lead of the circuit;

(d) Connecting a fifth lead of the circuit to one of the two remaining unsevered leads of the headlight;

(c) Connecting a sixth lead of the circuit to the other of the two remaining unsevered leads of the headlight;

(f) Connecting a first lead of said circuit to a point in the vehicle which is at a positive potential only when the vehicle engine is running;

(g) Connecting a second lead to the positive terminal of said battery.

* * * * *

UNITED STATES PATENT AND TRADEMARK OFFICE

CERTIFICATE OF CORRECTION

PATENT NO. : Re. 34,886

DATED : March 28, 1995

INVENTOR(S) : Tsutomu Irie

It is certified that error appears in the above-indentified patent and that said Letters Patent is hereby corrected as shown below: Item [30], Title page, under the heading "Foreign Application Priority Data" "May 2, 1987" should read --February 5, 1987--.

Signed and Sealed this

Twelfth Day of March, 1996

Bruce Lehman

*Attest:*

BRUCE LEHMAN

*Attesting Officer*

*Commissioner of Patents and Trademarks*